No. 750,849. PATENTED FEB. 2, 1904.
J. P. A. HANLON.
SCREW DRIVER.
APPLICATION FILED MAY 20, 1901.
NO MODEL.
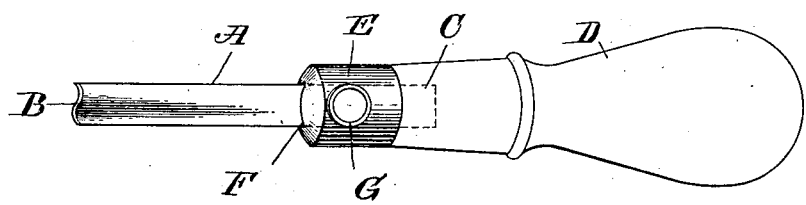
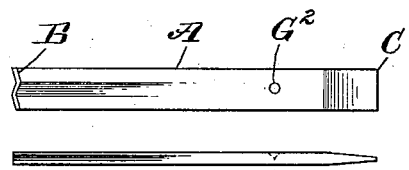
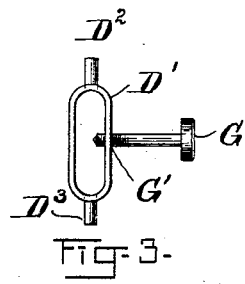
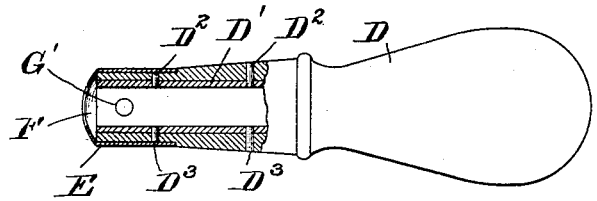
WITNESSES—
Geo. A. Hanlon
Charles V. Gooding
INVENTOR—
Joseph P. A. Hanlon No. 750,849. Patented February 2, 1904.

UNITED STATES PATENT OFFICE.

JOSEPH P. A. HANLON, OF SOMERVILLE, MASSACHUSETTS.

SCREW-DRIVER.

SPECIFICATION forming part of Letters Patent No. 750,849, dated February 2, 1904.

Application filed May 20, 1901. Serial No. 61,050. (No model.)

*To all whom it may concern:*

Be it known that I, JOSEPH P. A. HANLON, a subject of the King of Great Britain, residing at Somerville, in the county of Middlesex and State of Massachusetts, have invented new and useful Improvements in Screw-Drivers, of which the following is a specification.

This invention relates to a screw-driver holder so constructed as to receive and firmly hold screw-driver blades provided with shanks of varying shapes and thickness.

The invention consists in the combination and arrangement of parts set forth in the following specification, and particularly pointed out in the claims thereof.

Referring to the drawings, Figure 1 is a perspective view of a screw-driver holder constructed in accordance with my invention with a screw-driver blade attached thereto. Fig. 2 is a central longitudinal section, partly in elevation, of my improved screw-driver holder. Fig. 3 is a detail end elevation of a casing for holding the screw-driver blade, together with a thumb-screw and pins attached thereto. Fig. 4 is a front and side elevation of a screw-driver blade formed in varying shapes at the opposite ends thereof. Fig. 5 illustrates the heads of three screws with slots of varying contours therein.

Like letters refer to like parts throughout the several views of the drawings.

In the drawings, D is a handle, preferably formed of wood.

$D'$ is a metallic casing oblong in cross-section, with rounded ends inserted in one end of said handle D and held in said handle by pins $D^2$ and $D^3$, driven through the portion of said handle surrounding the casing $D'$ and into said casing.

E is a ferrule surrounding a portion of the handle D outside two of the pins $D^2$ and $D^3$ and the casing $D'$. Said ferrule E is provided with a slot F in the end thereof to admit the shank of a screw-driver blade and allow the same to be inserted in the casing $D'$. A clamp-screw G projects through the ferrule E and handle D and has screw-threaded engagement with one side of the casing $D'$ at $G'$.

In Figs. 1 and 4 I have illustrated a screw-driver blade A, which at its right-hand end C is beveled to fit the slot in the head of a screw of usual construction, while the left-hand end B is formed to fit slots of zigzag or curvilinear outline, as illustrated in the two forms of screw-head at the right and left of the three forms illustrated in Fig. 5. A depression $G^2$ is provided in the screw-driver blade A to receive the end of the clamp-screw G and assist in holding the screw-driver blade in the handle D when said clamp-screw is forced thereagainst.

The metallic casing $D'$ is made of sufficient width laterally to receive screw-driver blades formed as illustrated at B or at C, Fig. 4, and the clamp-screw G takes up any inequality in thickness of different blades which may be inserted into the handle and into the interior of the casing $D'$, the pins $D^2$ $D^3$ preventing the casing from being withdrawn from the handle D and holding it firmly attached thereto, while the ferrule E strengthens the handle where it surrounds the casing and also prevents the pins $D^2$ and $D^3$ from accidentally becoming detached from said casing.

In putting my screw-driver holder into practical operation one end of the screw-driver blade is inserted in the interior of the casing $D'$ through the slot F in the ferrule E and is clamped to said casing by the clamp-screw G, which preferably enters a depression $G^2$, formed in said screw-driver blade. The screw-driver is then used as an ordinary screw-driver in the manner well known to those skilled in the art.

Having thus described my invention, what I claim, and desire by Letters Patent to secure, is—

1. As an article of manufacture, a screw-driver holder comprising in its construction a handle, a metallic casing inserted therein and constructed to receive shanks of screw-drivers of varying shapes and thickness, a thumb-screw having screw-threaded engagement with said casing and projecting laterally therefrom through said handle, pins fast to said casing and projecting laterally therefrom through said handle, and a ferrule encircling said handle outside said pins and casing.

2. As an article of manufacture, a screw-driver holder comprising in its construction a handle, a metallic casing inserted therein and constructed to receive reversible blades of screw-drivers of varying shapes, a thumb-screw having screw-threaded engagement with said casing and projecting laterally therefrom through said handle, pins fast to said casing and projecting laterally therefrom through said handle, and a ferrule encircling said handle outside said pins and casing.

In testimony whereof I have hereunto set my hand in presence of two subscribing witnesses.

JOSEPH P. A. HANLON.

Witnesses:
GEO. O. HANLON,
WM. HENRY FORREST.